(12) United States Patent
Fujii

(10) Patent No.: US 8,469,137 B2
(45) Date of Patent: Jun. 25, 2013

(54) WORKING VEHICLE

(75) Inventor: Takashi Fujii, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/418,889

(22) Filed: Mar. 13, 2012

(65) Prior Publication Data

US 2013/0048409 A1 Feb. 28, 2013

(30) Foreign Application Priority Data

Aug. 22, 2011 (JP) ................................ 2011-180919

(51) Int. Cl.
*B62D 21/12* (2006.01)

(52) U.S. Cl.
USPC ............................ 180/312; 280/781; 280/785

(58) Field of Classification Search
USPC .......... 280/781, 785, 788, 794, 798; 180/311, 180/312, 908, 89.1, 208, 89.17, 364
See application file for complete search history.

(56) References Cited

U.S. PATENT DOCUMENTS

| | | | |
|---|---|---|---|
| 4,798,400 A | | 1/1989 | Kosuge |
| 4,836,738 A | * | 6/1989 | Nozaka et al. ................ 414/607 |
| 7,347,490 B2 | * | 3/2008 | Kobayashi et al. ........... 296/204 |
| 7,461,851 B2 | * | 12/2008 | Yamamura et al. .... 280/124.135 |
| 8,047,557 B2 | * | 11/2011 | Kobayashi et al. .... 280/124.135 |
| 2002/0185326 A1 | * | 12/2002 | Mercier ........................ 180/311 |
| 2004/0035623 A1 | * | 2/2004 | Fecteau et al. ................ 180/210 |
| 2004/0206567 A1 | * | 10/2004 | Kato et al. .................... 180/291 |
| 2009/0091101 A1 | * | 4/2009 | Leonard et al. ............... 280/638 |
| 2010/0270785 A1 | * | 10/2010 | Honzek ......................... 280/785 |

FOREIGN PATENT DOCUMENTS

JP 63-20284 1/1988

OTHER PUBLICATIONS

U.S. Appl. No. 13/418,846 to Takashi Kuramoto, which was filed Mar. 13, 2012.

* cited by examiner

*Primary Examiner* — Ruth Ilan
*Assistant Examiner* — Darlene P Condra
(74) *Attorney, Agent, or Firm* — Greenblum & Bernstein, P.L.C.

(57) ABSTRACT

Provided are a pair of left and right upper frames extending in a longitudinal direction; a mount frame supporting a transmission case below the upper frames; and vertical frames connecting the upper frames and the mount frame. Rear suspension arms are supported on the vertical frames. The vertical frames are configured to have upper members connected to the upper frames and lower members connected to the mount frame. The upper and lower members are separably connected.

14 Claims, 13 Drawing Sheets

WORKING VEHICLE

CROSS-REFERENCE TO RELATED APPLICATIONS

The present application claims priority under 35 U.S.C. §119 of Japanese Application No. 2011-180919, filed on Aug. 22, 2011, the disclosure of which is expressly incorporated by reference herein in its entirety.

BACKGROUND OF THE INVENTION

1. Field of the Invention

The present invention relates to a working vehicle in which a transmission case is supported on a vehicle body frame, the transmission case speed-changing a driving force from an engine and transmitting the driving force to left and right rear wheels. More specifically, the present invention relates to a configuration in which the transmission case is detachably supported on the vehicle body frame.

2. Description of Related Art

As a working vehicle configured as described above, Related Art 1 discloses a configuration in which an engine support frame is arranged at a rear portion of a vehicle body; a suspension frame is detachably provided on an L-shaped pipe, the L-shaped pipe constituting the engine support frame; and rear wheel differentials and the like of rear wheels are supported on the suspension frame.

In the configuration of Related Art 1, the suspension frame is detachably provided. Therefore, a drive system of the rear wheels is detached together with the suspension frame.

[Related Art 1] Japanese Patent Laid-Open Publication No. SHO 63-20284

The suspension frame disclosed in Related Art 1 achieves suspension functionality by vertical displacement integral with the rear wheel differentials and the like that drive the rear wheels. This configuration is effective for a vehicle having a lightweight drive system such as a relatively small buggy.

However, for a working vehicle having a large and heavy transmission case, in a configuration in which a drive system of the rear wheels, including the transmission case, is supported on a suspension frame, not only does a movable part become large and heavy, it also leads to large suspension unit systems such as suspension springs. Therefore, there is room for improvement.

A configuration in which a drive system can be separated from a vehicle body frame integrally with rear wheels not only facilitates maintenance and repairs, but also is desired in terms of assembly, because, when assembling a working vehicle in a mass production line, the drive system of the rear wheels can be pre-assembled and unitized.

SUMMARY OF THE INVENTION

A purpose of the present invention is to reasonably configure a working vehicle in which a suspension system and a drive system for rear wheels can be easily separated from a vehicle body frame.

Means for Solving the Problems

One aspect of the present invention is a working vehicle in which a transmission case speed-changing a driving force from an engine and transmitting the driving force to left and right rear wheels is supported on a vehicle body frame. The vehicle body frame includes a pair of left and right upper frames extending in a longitudinal direction; an underframe arranged below the upper frames; and vertical frames having upper ends connected to the left and right upper frames and lower ends connected to the underframe. The vehicle body frame is provided with a mount frame, as the underframe, supporting the transmission case. The mount frame is provided in a manner separated from or in a manner separably connected to the underframe provided at a position forward of the mount frame. The vertical frames that connect to the mount frame are configured in a manner that the upper ends of the vertical frames are separably connected to the upper frames or in a manner that middle portions of the vertical frames are separable. Suspension arms are supported in a manner swingable about longitudinally orientated swing axes with respect to portions of the vertical frames that are fixedly provided on the mount frame. The rear wheels are rotatably supported on swinging ends of the suspension arms. Rear wheel drive shafts are provided transmitting the driving force from the transmission case to the rear wheels.

According to this configuration, the upper ends of the vertical frames are separated from the upper frames, or the middle portions of the vertical frames are separated, and, in a case where the front position of the mount frame is connected to the underframe, the connecting portion is separated. Thereby, the mount frame can be separated from the upper frames and the underframe. That is, because the transmission case is supported in a fixed state on the mount frame, the suspension arms are swingably supported on the vertical frames connected to the mount frame, and the rear wheels are supported on the suspension arms, the transmission case and the suspension arms can be integrally detached in a form of being withdrawn downward by configuring the vertical frames to be separable. In this configuration, as compared to a configuration in which the transmission case is taken out upwardly, it is not necessary to separate the drive system that transmits the driving force from the transmission case to the rear wheels. Therefore, not only can the operation for the separation be simplified, time and effort can also be reduced when assembling the working vehicle. Therefore, a working vehicle is configured that allows a suspension system and a drive system of rear wheels to be easily separated from a vehicle body frame and that also allows assembly time and effort in a mass production line to be reduced.

In the present invention, a dimension of the mount frame in a vehicle body width direction is configured to be shorter than a dimension of the left and right upper frames in the vehicle body width direction. Accordingly, of the plurality of vertical frames, those vertical frames that are connected to the mount frame are configured in an inclined manner such that upper ends of these vertical frames are increasingly displaced toward the outside of the vehicle body. This plurality of vertical frames is configured such that lower members have lower ends connected to the mount frame and upper members have upper ends connected to the upper frames. The upper members and the lower members may be separably connected to one another.

According to this configuration, the vertical frames are configured in an inclined manner such that the upper ends of the vertical frames are increasingly displaced toward the outside of the vehicle body, and the vertical frames are configured such that the lower members have the lower ends connected to the mount frame and the upper members have the upper ends connected to the upper frames. Therefore, for example, it is also possible to adopt a connection form in which an inner surface formed in the inclined manner on a lower member contacts an outer surface formed in the inclined manner on an upper member. In this connection form, when the mount frame is moved downward, separation is performed in a manner that the inner surfaces of the lower members move downward from the outer surfaces of the upper members. This allows separation and connection to be easily performed.

In the present invention, the engine is connected to a position forward of the transmission case. A support frame is provided separably connected to the underframe at a position forward of the mount frame. A mount support may be provided supporting the engine with respect to the support frame.

According to this configuration, when separating the mount frame from the upper frames, by separating the support frame from the underframe, the transmission case and the engine can be integrally detached in a state in which the transmission case and the engine are connected.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the following, an embodiment of the present invention is explained based on the drawings.

(Overall Configuration)

Figure 1:
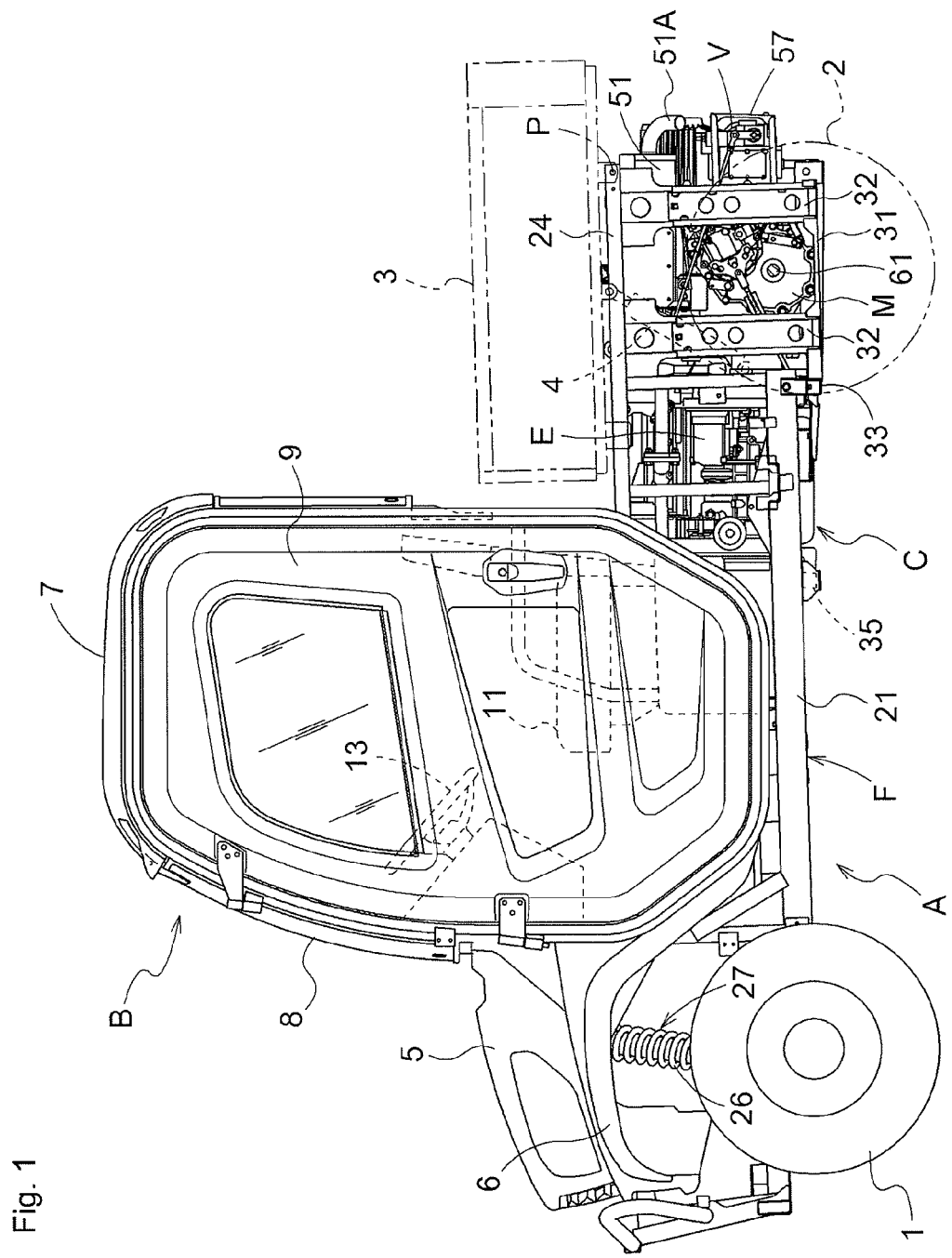
FIG. 1 is an entire side view of a working vehicle.
Figure 2:
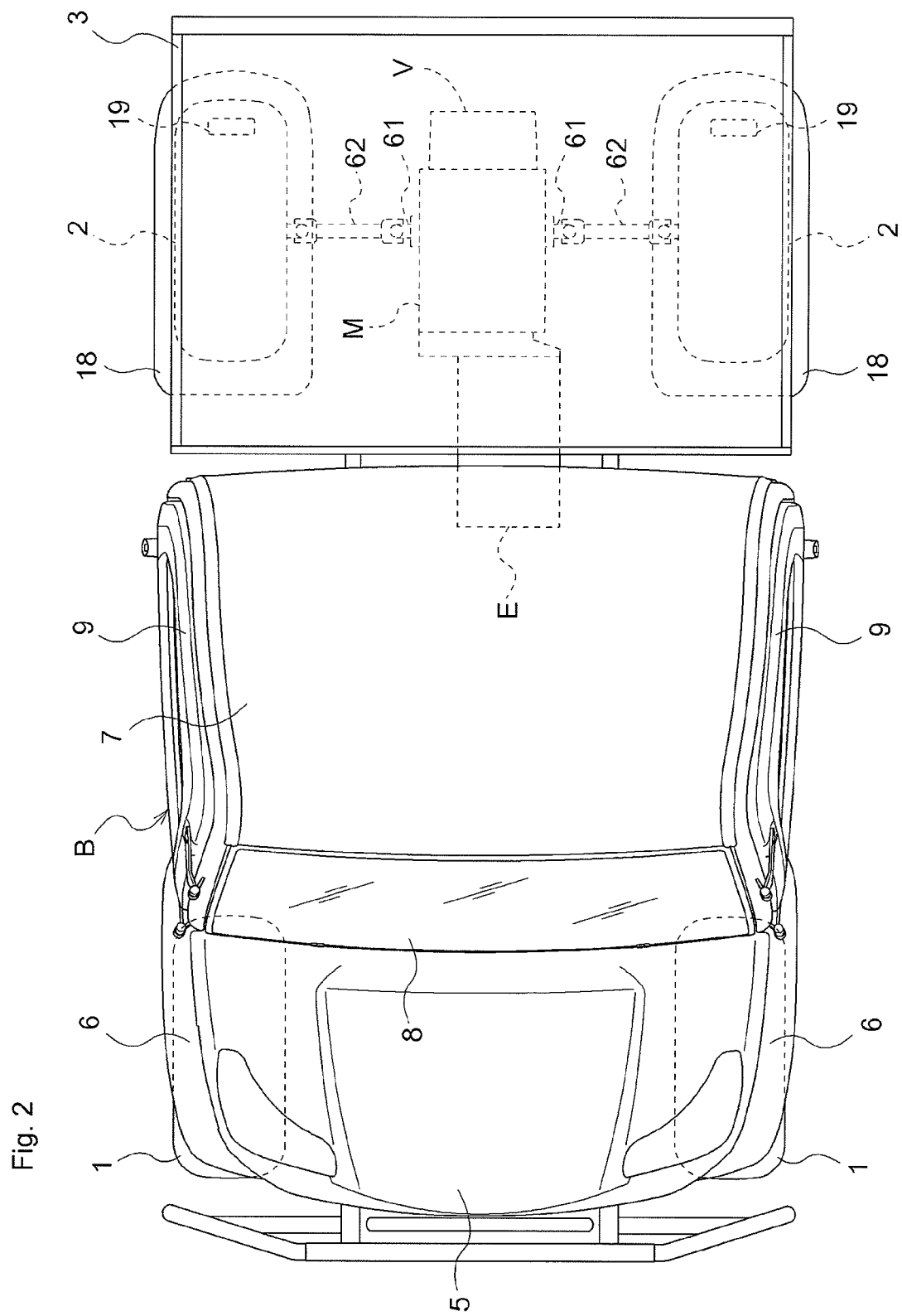
FIG. 2 is an entire plan view of the working vehicle.
Figure 3:
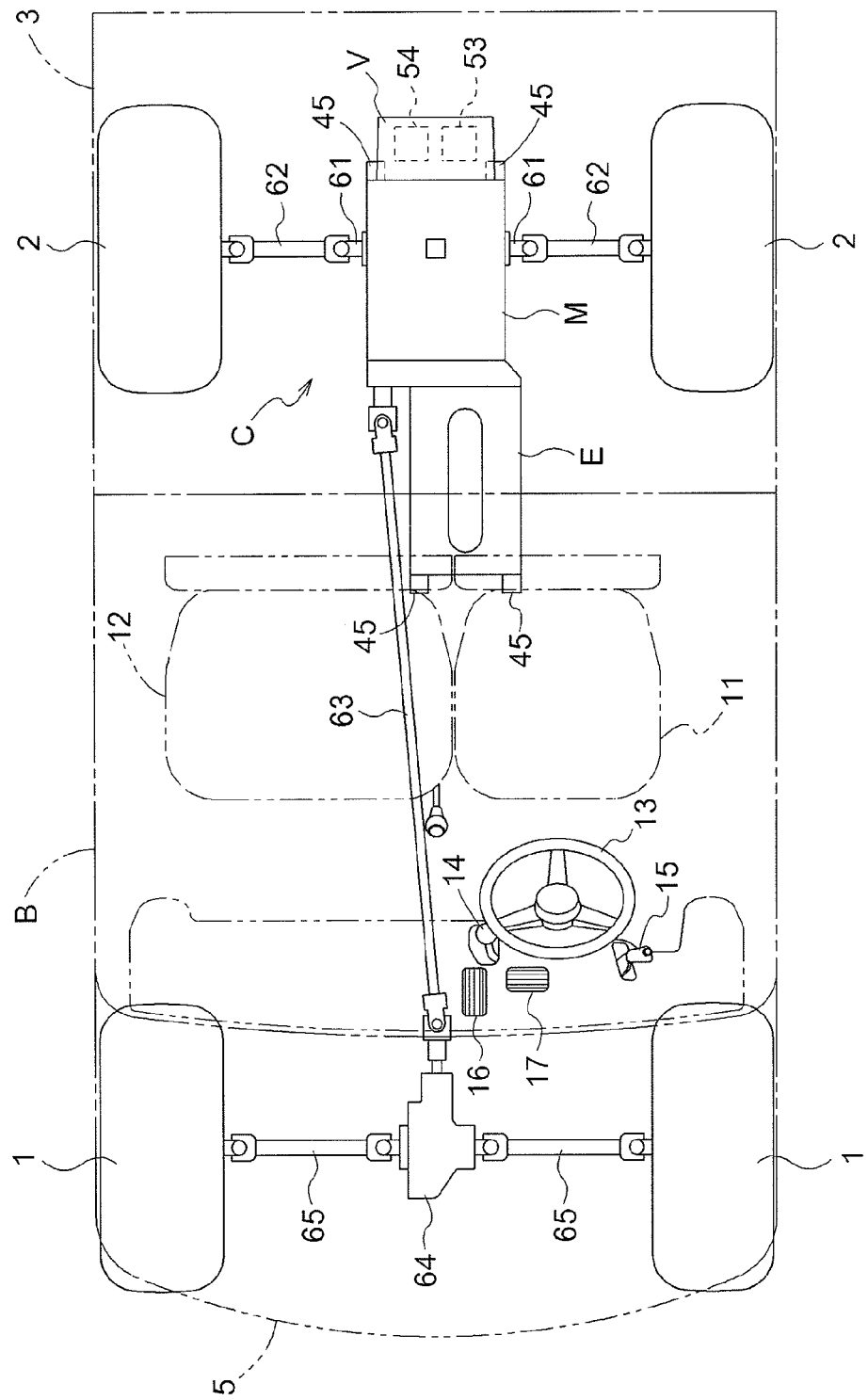
FIG. 3 is a plan view illustrating a transmission system of the working vehicle.

As FIGS. 1-3 illustrate, a working vehicle is configured in which a traveling vehicle body A is provided with a pair of freely steerable left and right front wheels 1 and a pair of left and right rear wheels 2; a cabin B constituting an operating unit is provided at a front position of the traveling vehicle body A; a cargo bed 3 is provided at a rear portion of the traveling vehicle body A; and a drive unit C is provided at a position below the cargo bed 3.

This working vehicle is of a four-wheel drive type that has a travel drive system transmitting a driving force from the drive unit C to the front wheels 1 and the rear wheels 2, and is configured as a utility vehicle used for multipurpose work such as agricultural work and transportation work. The cargo bed 3 is configured in a manner that a rear end side of the cargo bed 3 is supported in a manner swingable about an axis P, which is in a lateral orientation with respect to a rear end position of the traveling vehicle body A, and a front end side of the cargo bed 3 can be raised via operation of a dump cylinder 4 to unload a load backward.

A hood 5 operable to open and close is provided at a front position of the traveling vehicle body A, and front fenders 6 covering above the front wheels 1 are arranged at the lower left and right of the hood 5. The cabin B is provided with a windshield 8 at a front portion of a cabin body 7 and doors 9 operable to open and close with respect to lateral sides of the cabin body 7.

The cabin B is provided with a driver seat 11 on which a driver sits and a laterally-long two-seater assistant seat 12 adjacent to the driver seat 11. Further, at positions in front of the driver seat 11, the cabin B is provided with a steering wheel 13 steering-controlling the front wheels 1, a main speed change lever 14, and a parking lever 15. At lower positions, the cabin B is also provided with an accelerator pedal 16 as a speed change operation tool controlling a traveling speed, and a brake pedal 17 operating brake devices (not illustrated in the drawings) of the front wheels 1 and the rear wheels 2.

Rear fenders 18 covering above the left and right rear wheels 2 are provided at a rear end side of the traveling vehicle body A. Brake lights 19 are provided on the rear fenders 18.

(Vehicle Body Frame)

Figure 4:
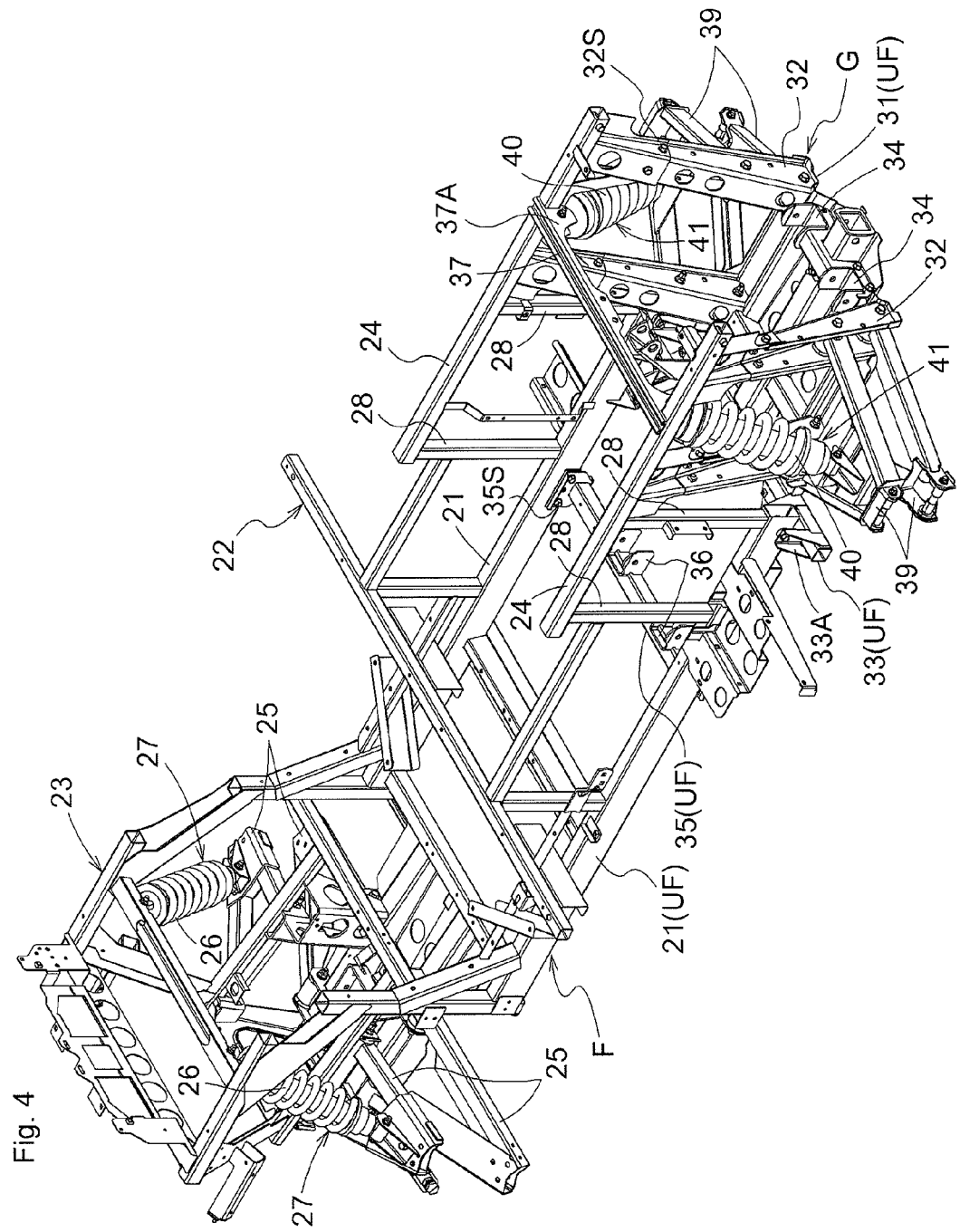
FIG. 4 is a perspective view of a vehicle body frame.

A vehicle body frame F is provided as a strength member of the traveling vehicle body A. As FIG. 4 illustrates, the vehicle body frame F is configured to include a pair of left and right main frames 21 extending in a longitudinal direction; a cabin frame unit 22 supporting the cabin B at a front position of the main frames 21; a front frame unit 23 connecting front ends of the main frames 21; a pair of left and right upper frames 24 located at positions above a rear position of the main frames 21 and extending in the longitudinal direction of the traveling vehicle body A in a manner parallel to the main frames 21; and a detachable frame unit G supporting the drive unit C.

Square-shaped steel pipes are used for the main frames 21 and the upper frames 24, and steel products such as squared pipes and channels are used for the cabin frame unit 22 and the front frame unit 23.

The cabin frame unit 22 is configured as a structure that includes a frame body in a lateral orientation arranged at a front portion of the cabin B and a frame body in a lateral orientation arranged at a lower side of the driver seat 11. The front frame unit 23 is a structure arranged below the hood 5, and, at each of a left and right position of the front frame unit 23, base end portions of a pair of upper and lower front suspension arms 25 configured as of a double wishbone type are supported in a manner swingable about longitudinally orientated swing axes. Further, lower ends of front suspension units 27 are supported by the front suspension arms 25, the front suspension units 27 having front suspension springs 26 that are compressed when the front suspension arms 25 swing upward. Upper ends of the front suspension units 27 are supported by the front frame unit 23.

The left and right main frames 21 and the upper frames 24 that are arranged above the main frames 21 are connected by vertically oriented connecting frames 28 that are formed using square-shaped steel pipes. Further, at a position adjacent to a rear end side of the main frames 21 and below the upper frames 24, the detachable frame unit G is arranged in a manner separably connected to the main frames 21 and the upper frames 24.

Figure 5:
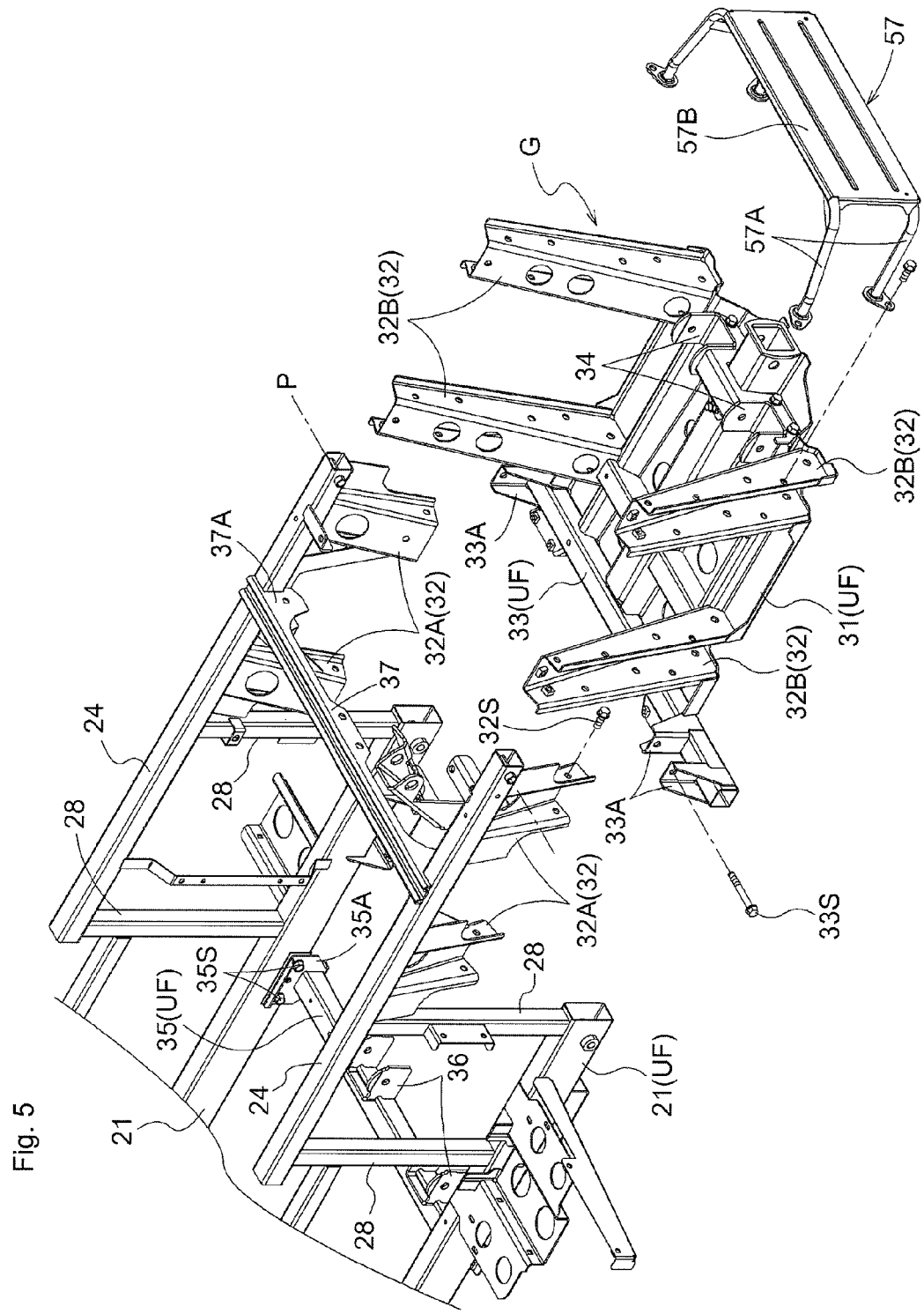
FIG. 5 is a perspective view illustrating a detachable unit of a rear portion of the vehicle body frame.
Figure 6:
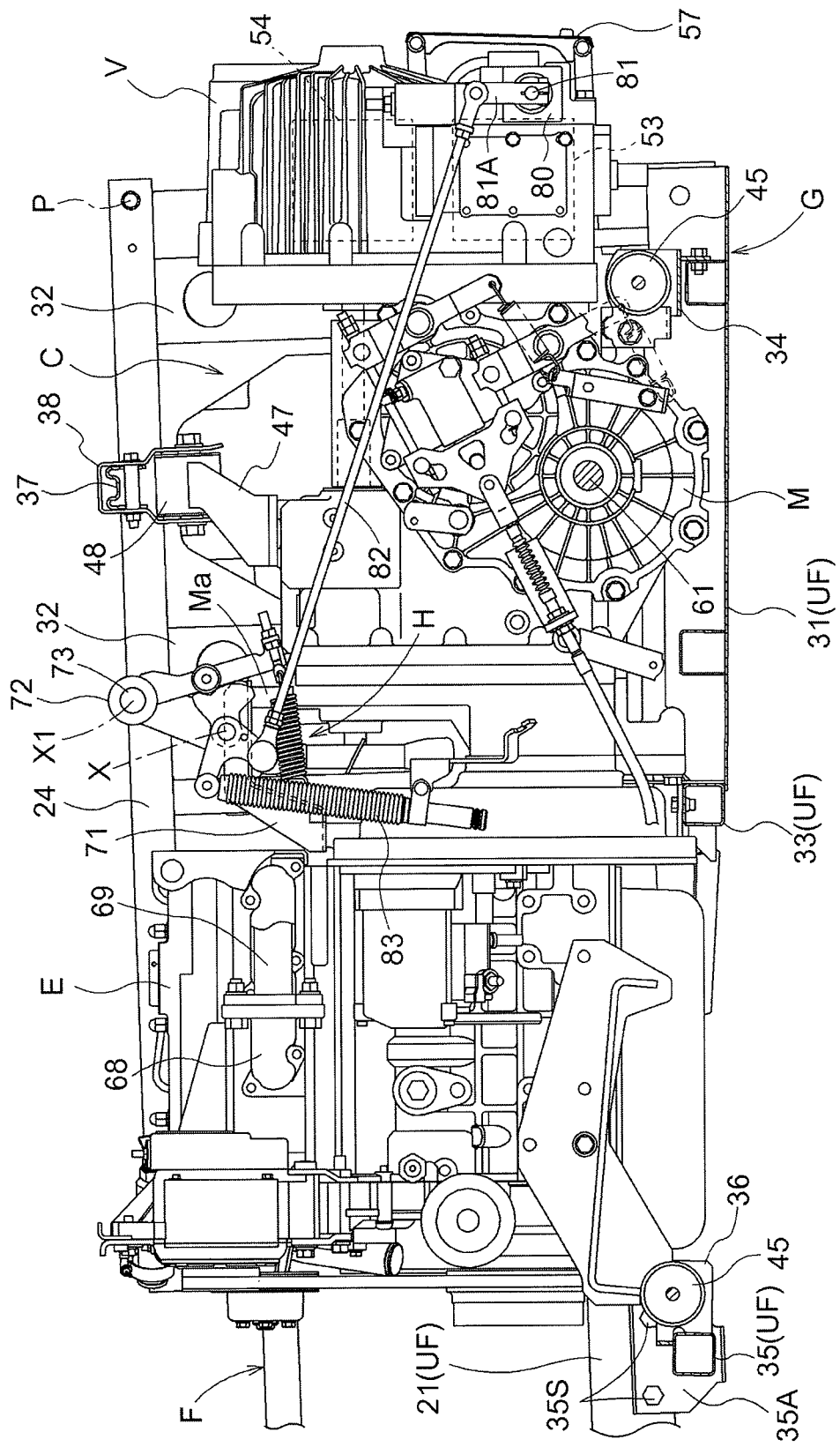
FIG. 6 is a side view of a drive unit.

As FIG. 6 illustrates, the drive unit C has a configuration that connects an engine E, a transmission case M, and a continuously variable transmission V (which is an example of a speed change unit). As FIGS. 5 and 6 illustrate, the detachable frame unit G is configured to include a mount frame 31 arranged at a lower side of the drive unit C (lower than the upper frames 24); two vertical frames 32 arranged on each of a left and right side of the mount frames 31 connecting the mount frame 31 to the left and right upper frames 24, the vertical frames 32 having a U-shaped cross-sectional shape; and a front frame 33 in a lateral orientation formed at a front end side of the mount frame 31.

The detachable frame unit G has also a functional capability of supporting the rear wheels 2, as described later, and is configured in a manner detachable from the vehicle body frame F, by separating the detachable frame unit G from the other frames, in a state in which the drive unit C and the rear wheels 2 are supported by the detachable frame unit G.

The mount frame 31 is formed by working, such as press working, a steel plate and has rib-like portions formed thereon to increase strength. The mount frame 31 has a lateral width configured to be shorter than a lateral distance between the left and right upper frames 24. The mount frame 31 is provided with a pair of left and right rear mount supports 34 to support the transmission case M. Further, in order to linearly connect two end portions of the mount frame 31 and the upper frames 24 via the vertical frames 32, the left and right vertical frames 32 are provided in an inclined manner such that an upper end side is increasingly displaced toward the outside of the vehicle body.

Figure 8:
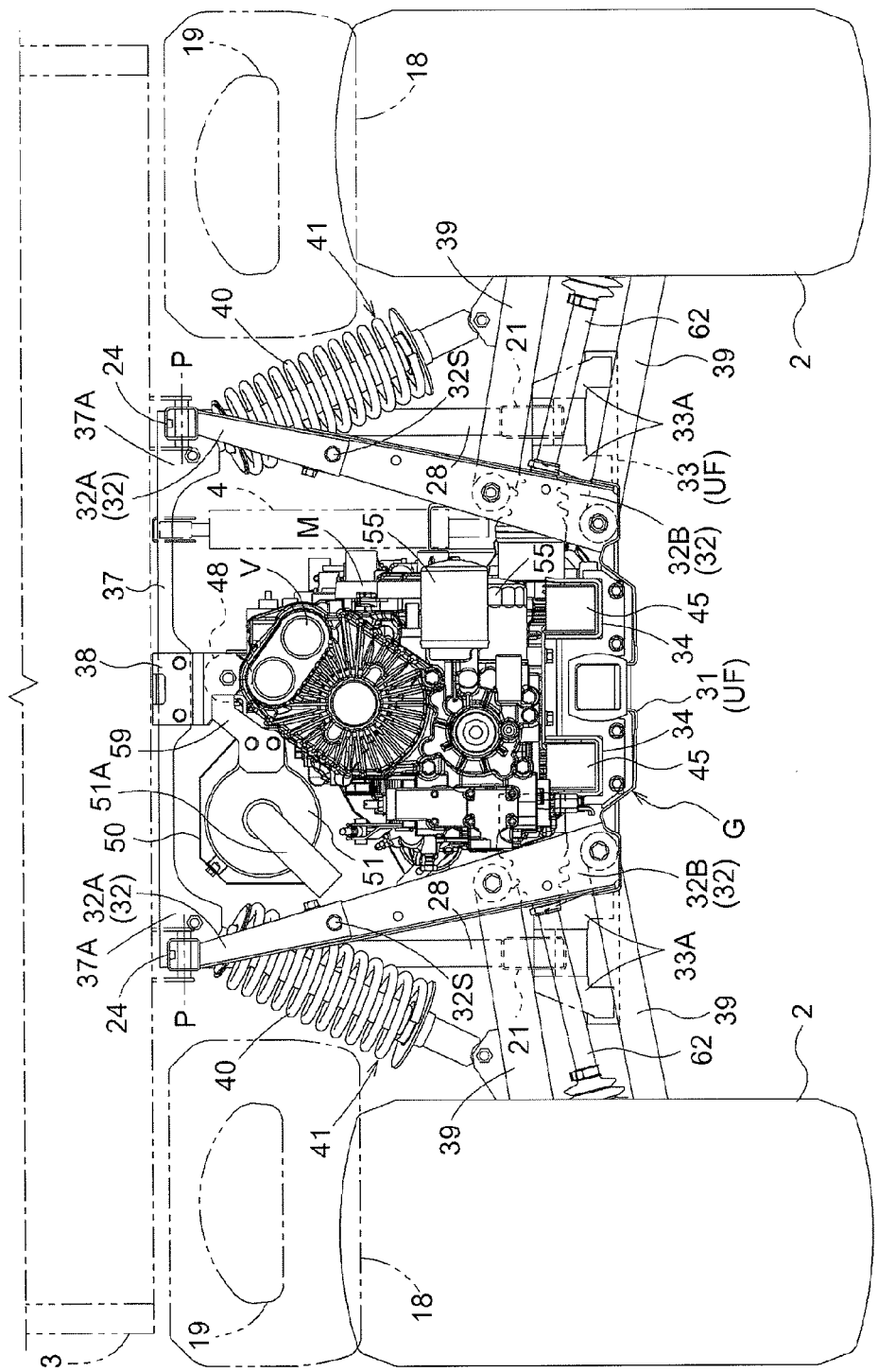
FIG. 8 is a rear view of a traveling vehicle body.

That is, as FIGS. 4, 5 and 8 illustrate, as viewed in the longitudinal direction, by providing the pair of left and right upper frames 24 at an upper portion, the mount frame 31 (which is an example of an underframe UF) at a lower portion, and the vertical frames 32 at two sides in an inclined manner such that an upper end side is increasingly displaced toward the outside of the vehicle body, when an imaginary line connecting upper ends of the left and right vertical frames 32 is used as an upper base and an imaginary line connecting lower ends of the left and right vertical frames 32 is used as a lower base, respective positional relationships are configured in such a manner that an inverted trapezoid is formed of which the upper base has a longer length than the lower base.

The vertical frames 32 are formed using channel-shaped steel and have a configuration in which upper members 32A, upper ends of which are connected to the upper frames 24, and lower members 32B, lower ends of which are connected to the mount frame 31, are separably connected to one another. A portion of an upper member 32A and a portion of a lower member 32B are overlapped, and such overlapping portions are separably connected to one another by inserting connecting bolts 32S through the overlapping portions. Further, brackets 33A are provided at two end portions of the front frame 33, and, by inserting insertion bolts 33S through the brackets 33A, the front frame 33 is separably connected to rear ends of the main frames 21.

A support frame 35 (which is an example of the underframe UF) formed from a square-shaped steel pipe is arranged in a lateral orientation near rear portions of the left and right main frames 21. Flange portions 35A of left and right end portions of the support frame 35 are separably connected to the main frames 21 by flange bolts 35S. Further, a pair of left and right front mount supports 36 are formed on the support frame 35 to support the engine E.

It is not necessary to use a plate material for the mount frame 31. The mount frame 31 may also be configured using a pair of left and right squared pipes. Further, it is also possible that the vertical frames 32 are not configured to have separable middle portions. For example, it is also possible to have a configuration in which upper end portions of the vertical frames 32 are separably connected to the upper frames 24. It is also possible to have a configuration in which lower end portions of the vertical frames 32 are separably connected to the mount frame 31.

A lateral frame 37 in a lateral orientation, which is formed with steel and has two ends connected to the left and right upper frames 24, is provided in a form bridging the upper frames 24 near rear ends of the upper frames 24. An upper mount support 38 is provided at a middle position of the lateral frame 37 for supporting the transmission case M in a form where the transmission case M hangs from the upper mount support 38. Suspension support portions 37A are formed at two end portions of the lateral frame 37.

The above described main frames 21, mount frame 31, front frame 33, and support frame 35 are arranged at lower positions on the vehicle body frame F. Therefore, these main frames 21, mount frame 31, front frame 33, and support frame 35 are collectively referred to as the underframe UF. As described above, the mount frame 31, the support frame 35, and the lower members 32B of the vertical frames 32 are separable with respect to other frames. Therefore, a portion of the underframe UF is configured to be separable.

With respect to the lower members 32B of the vertical frames 32 on each of the left and right sides, base end portions of a pair of upper and lower rear suspension arms 39 configured as of a double wishbone type are supported in a manner swingable about longitudinally orientated swing axes. Further, lower ends of rear suspension units 41 are supported by the rear suspension arms 39, the rear suspension units 41 having rear suspension springs 40 that are compressed when the rear suspension arms 39 swing upward. Upper ends of the rear suspension units 41 are supported by the suspension support portions 37A of the lateral frame 37. The upper ends of the rear suspension units 41 may be supported by the upper frames 24. It is also possible that support brackets are provided on the upper frames 24 and the upper ends of the rear suspension units 41 are supported by the support brackets.

(Drive Unit)

As FIGS. 3, 6, 7, 9, and 10 illustrate, the drive unit C is configured with the engine E, the transmission case M, and the continuously variable transmission V integrated by connecting in this order the engine E, the transmission case M, and the continuously variable transmission V. Two lower left and right sites of a front end position of the engine E are supported in the pair of left and right front mount supports 36 of the support frame 35 by lower anti-vibration mounts 45. Two lower left and right sites of a rear end position of the transmission case M are supported in the pair of left and right rear mount supports 34 of the mount frame 31 by lower anti-vibration mounts 45. An upper end portion of a hanging frame 47 that protrudes on an upper surface of the transmission case M is supported in the upper mount support 38 by an upper anti-vibration mount 48.

These lower anti-vibration mounts 45 and the upper anti-vibration mount 48 are configured with bush-type anti-vibration rubber, and function to inhibit vibration transmitted from the drive unit C to the vehicle body frame F. As described above, the lateral width of the mount frame 31 is relatively short. Therefore, the distance between the left and right lower anti-vibration mounts 45 that support the transmission case M is designed to be short, and a configuration is formed in which the upper portion of the drive unit C is likely to vibrate in the lateral direction. With regard to this point, the transmission case M is supported with respect to the lateral frame 37 in a form where the upper portion of the transmission case M is hung on the upper anti-vibration mount 48, the lateral frame 37 being provided bridging the left and right upper frames 24. Therefore, the vibration of the drive unit C in the lateral direction can be inhibited.

A muffler 51 having a cover 50 thereabove for protection against heat is provided at a left side of an upper position of the transmission case M to reduce exhaust sound of the engine E.

An internal structure of the transmission case M is not illustrated in the drawings. However, the transmission case M has built-in a gear-type transmission and a differential gear (not illustrated in the drawings), the transmission speed-changing a driving force speed-changed by the continuously variable transmission V into a plurality of speeds and performing forward and backward switching.

Figure 7:
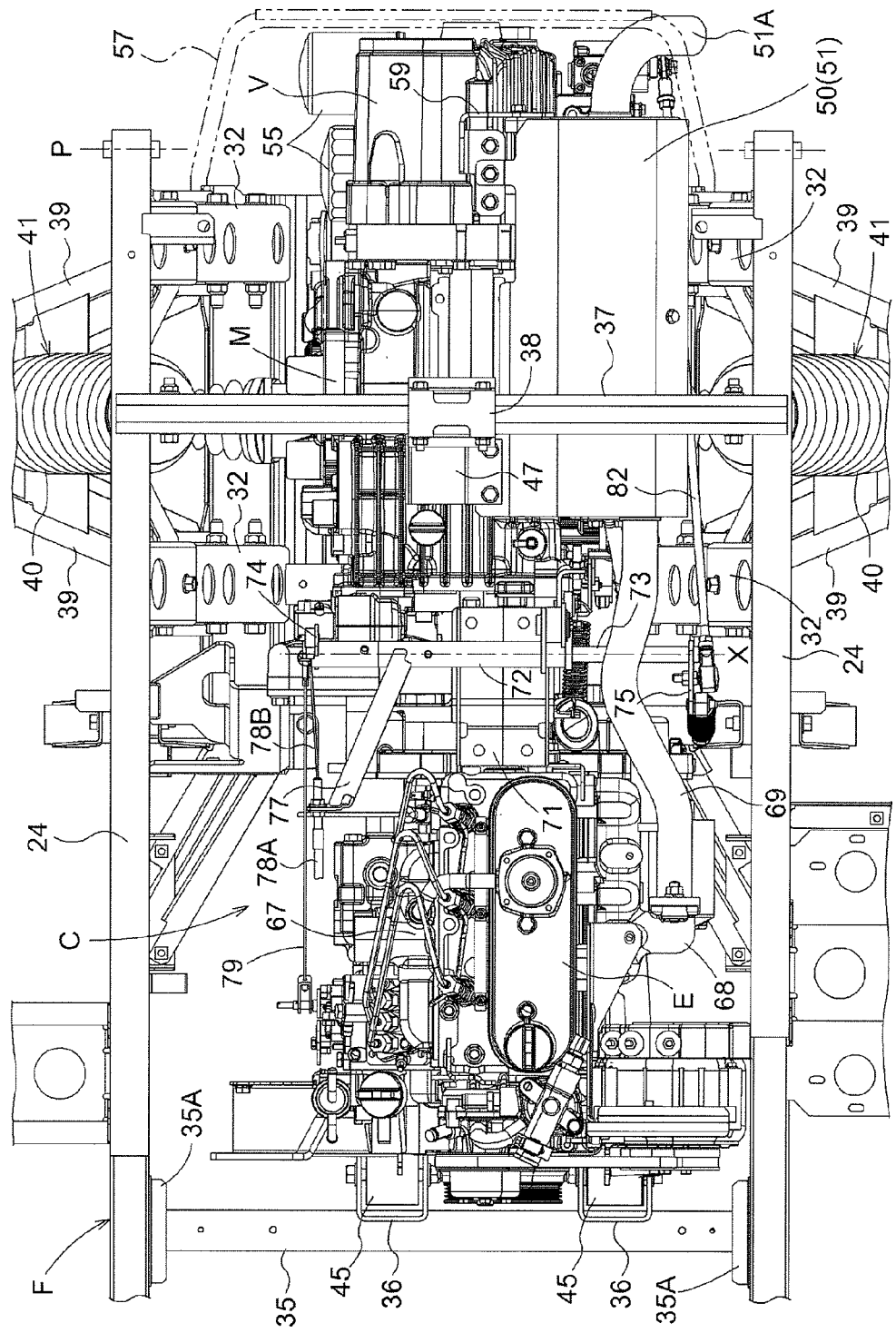
FIG. 7 is a plan view of the drive unit.
Figure 10:
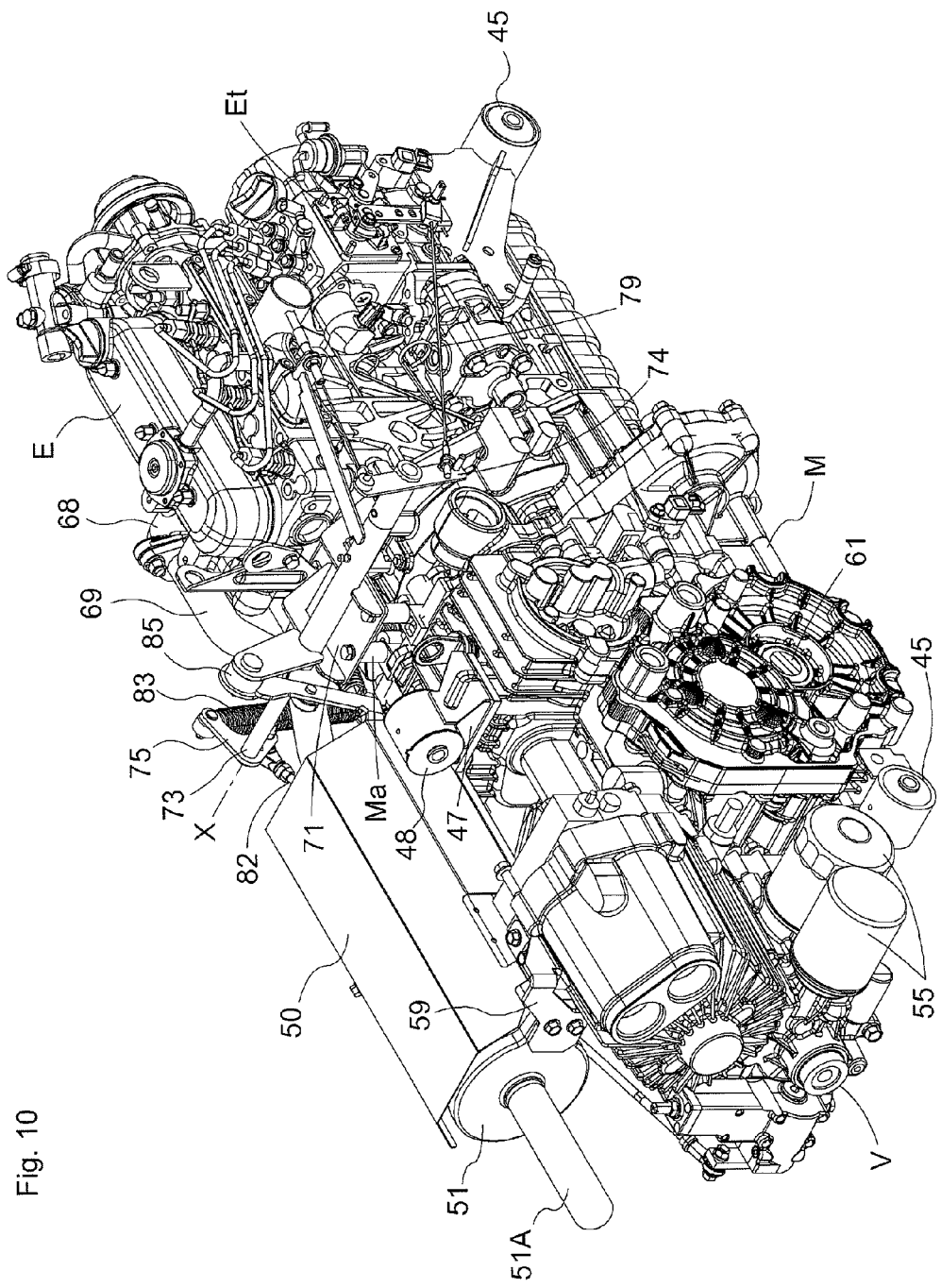
FIG. 10 is a perspective view of the drive unit and the speed change operation structure.
Figure 11:
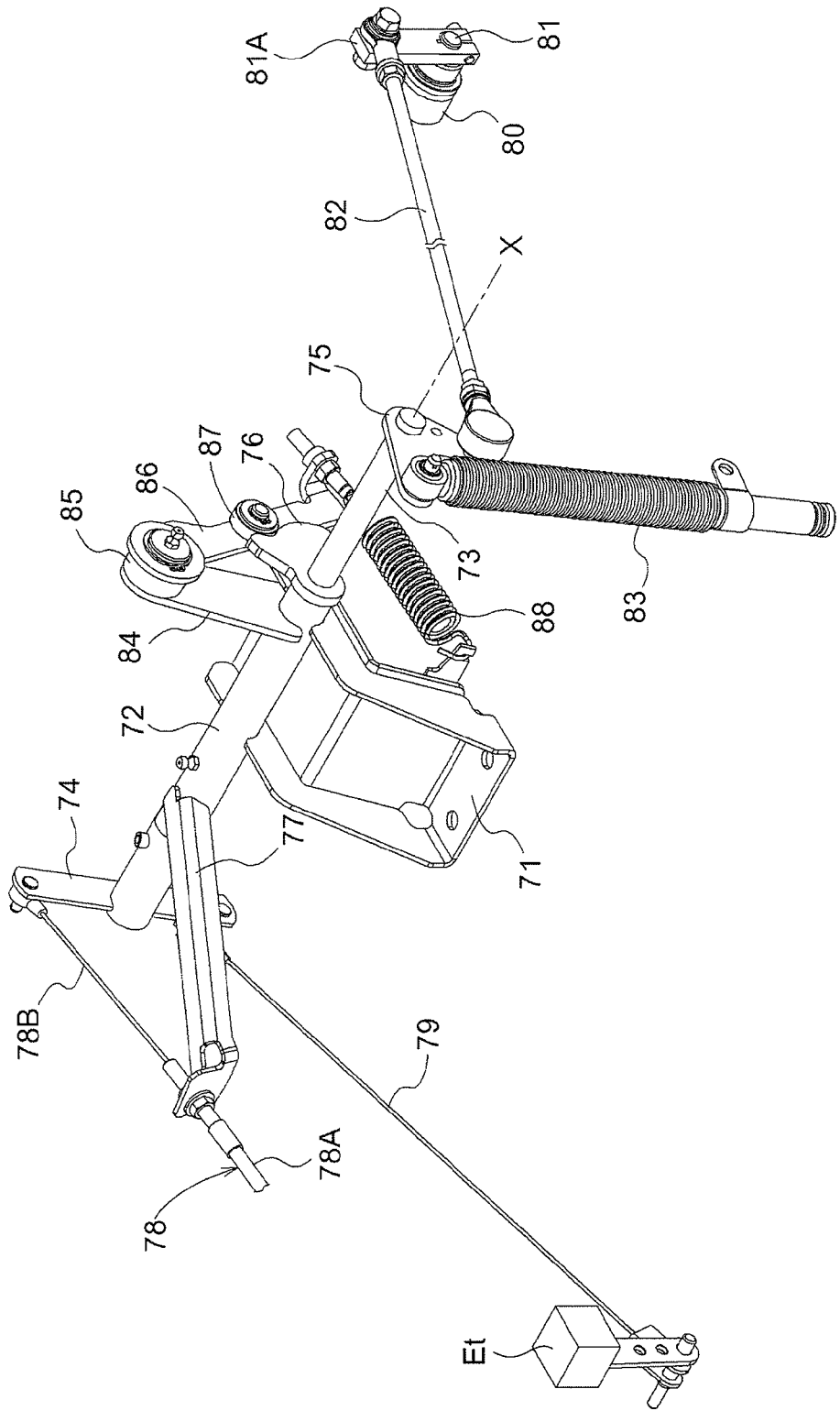
FIG. 11 is a perspective view of the speed change operation structure.

As FIG. 6 illustrates, the continuously variable transmission V includes a hydraulic pump 53 of a variable capacity, axial plunger type, which operates by using a driving force from the engine E, and a hydraulic motor 54 of an axial plunger type, which rotates by using hydraulic oil supplied from the hydraulic pump 53. As FIGS. 7 and 10 illustrate, at a lateral side of a rear portion of the continuously variable transmission V, two oil filters 55 filtering the hydraulic oil are detachably provided. One of the two oil filters 55 is arranged on a suction side to suck the hydraulic oil into the hydraulic pump, and the other is arranged on a drain side to drain the hydraulic oil.

In the drive unit C, a transmission system is configured in which the engine E is provided in a manner that an axis of an output shaft (crankshaft: not illustrated in the drawings) thereof is configured in the longitudinal direction; the driving force from the engine E is transmitted to the hydraulic pump 53 of the continuously variable transmission V by passing a transmission shaft (not illustrated in the drawings) coupled to the output shaft through the transmission case M in the longitudinal direction; and a driving force from the hydraulic motor 54 of the continuously variable transmission V is transmitted to the transmission case M. Further, in the transmission case M, the transmission system is configured in a manner that the driving force is speed-changed by the transmission, is transmitted to left and right rear output shafts 61 from the differential gear, and is transmitted from the rear output shafts 61 via rear wheel drive shafts 62 to the left and right rear wheels 2; and in addition, as FIG. 3 illustrates, the driving force is transmitted from a lower output shaft (not illustrated in the drawings) formed at a lower side and a drive shaft 63 to a front wheel differential gear 64, and is further transmitted from front wheel drive shafts 65 to the left and right front wheels 1.

In particular, in order to avoid contact between the drive shaft 63 and an oil pan on a lower portion of the engine E, a center position of the engine E in the lateral direction is arranged to be deviated to the left side with respect to a center position of the transmission case M in the lateral direction. It is also possible that the center position of the engine E in the lateral direction is arranged to be deviated to the right side with respect to the center position of the transmission case M in the lateral direction, and the drive shaft 63 is arranged on the left side of the lower portion of the engine E.

Figure 13:
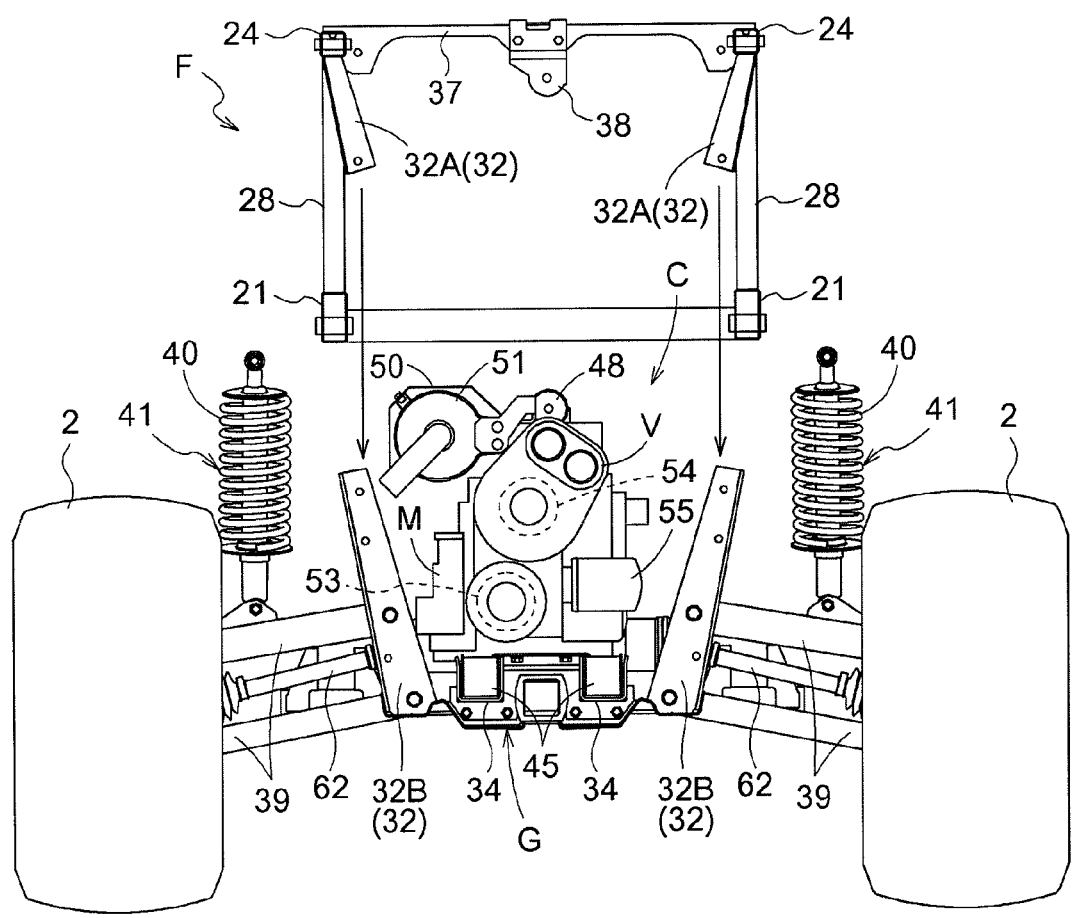
FIG. 13 is a rear view illustrating a detachable frame unit in a separated state.

As FIGS. 6 and 13 illustrate, the continuously variable transmission V is configured in a manner that the hydraulic pump 53 is arranged at a lower side and the hydraulic motor 54 is arranged at an upper side. In this configuration, an upper end level of the continuously variable transmission V is configured to be at a position higher than an upper surface of the transmission case M. The upper end of the continuously variable transmission V protrudes above the upper surface of the transmission case M. In order to reduce the amount of the upward protrusion of the continuously variable transmission V and to enlarge a configuration space for the muffler 51 on the left side portion of the upper portion of the continuously variable transmission V, the continuously variable transmission V is configured to be in an inclined state in a manner that the upper end side of the continuously variable transmission V is displaced toward the right side (outside) as viewed in the longitudinal direction. It is also possible to have a configuration in which the continuously variable transmission V is configured to be in an inclined state in a manner that the upper end side of the continuously variable transmission V is displaced toward the left side (outside) as viewed in the longitudinal direction, and the muffler 51 is arranged on the right side of the continuously variable transmission V. Further, it is also possible to arrange the muffler 51 on outside of the vehicle body frame F.

The continuously variable transmission V is arranged at a position such that a rear end portion of the continuously variable transmission V protrudes slightly backward from a rear end of the vehicle body frame F. As FIGS. 5 and 7 illustrate, a protector 57 protecting the rear end portion is provided at the rear end of the vehicle body frame F. The protector 57 is configured to include pipe frames 57A, which are separably connected to back sides of the lower members 32B of the left and right vertical frames 32 in the rear position, and a protection plate 57B, which has a shape of a vertical wall and is supported by the pipe frames 57A. By separating the pipe frames 57A from the vertical frames 32, the protector 57 is separated from the vehicle body frame F, which facilitates replacement of the oil filters 55 and maintenance of the continuously variable transmission V.

Figure 9:
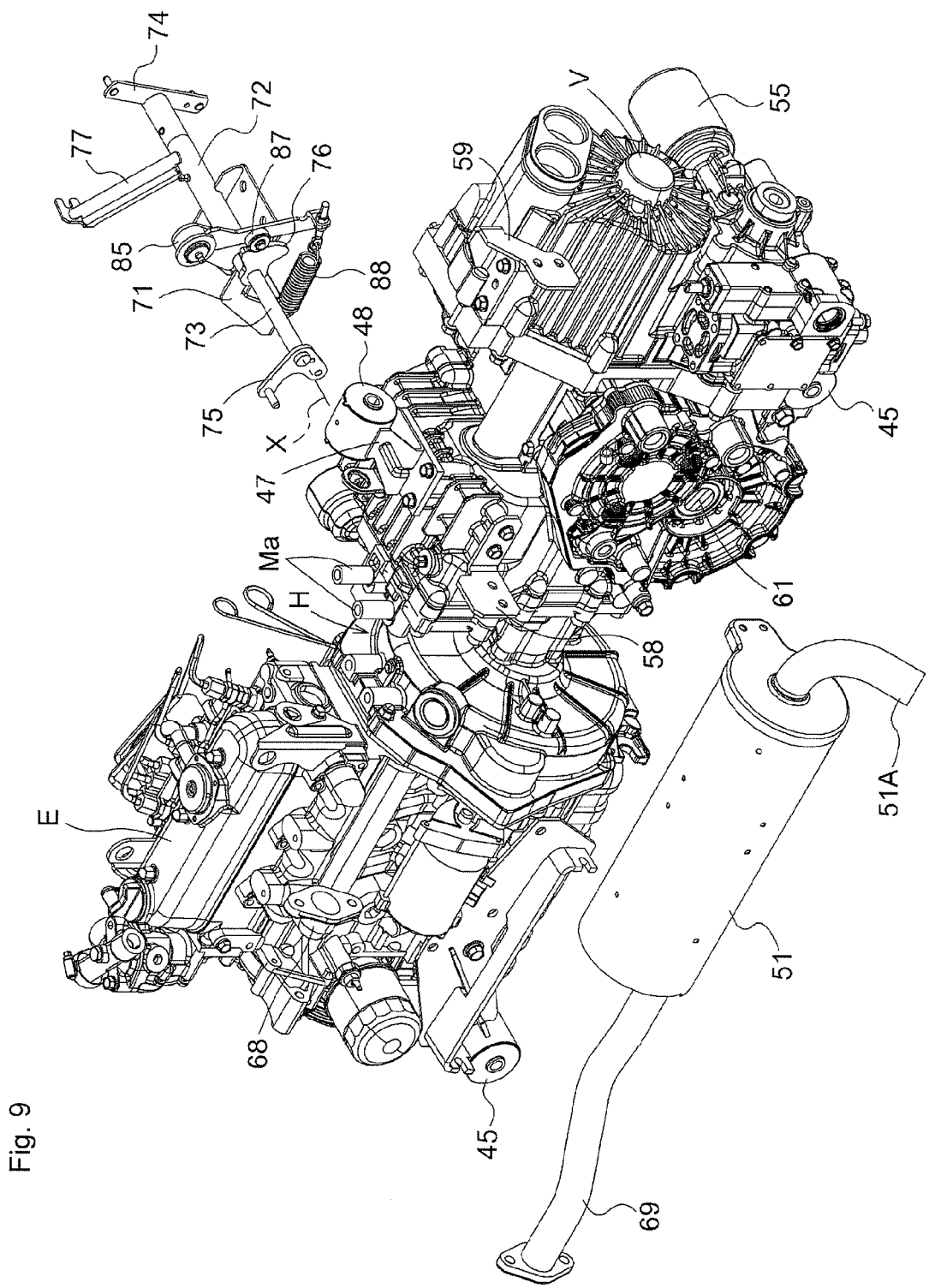
FIG. 9 is a perspective view of a state in which a speed change operation structure is separated from the drive unit.

As FIGS. 7, 9, and 10 illustrate, the engine E is provided with an intake manifold 67 on the right side of the upper surface thereof supplying air from an air cleaner (not illustrated in the drawings). The engine E is further provided with an exhaust manifold 68 on the left side. An exhaust pipe 69 is arranged between the exhaust manifold 68 and the muffler 51.

The muffler 51 is formed in a cylindrical shape, and is provided with a curved cylindrical exhaust portion 51A at a rear end to discharge exhaust gas downward and to the left. The muffler 51 has a front end portion supported by a front bracket 58 on an upper surface of the transmission case M and a rear end portion supported by a rear bracket 59 on an upper surface of the continuously variable transmission V. The cover 50 for protection against heat has a front end portion supported by a screw and the like on the upper surface of the transmission case M and a rear end portion supported by a screw and the like on the upper surface of the continuously variable transmission V. Further, the above described exhaust portion 51A is arranged at a position where the exhaust portion 51A does not contact the cargo bed 3 when the cargo bed 3 is raised, and the exhaust direction of the exhaust portion 51A is configured in a manner that the exhaust gas is discharged to a space where no parts exist in its neighborhood. Although not illustrated in the drawings, the front bracket 58 supporting the front end portion of the muffler 51 and the rear bracket 59 supporting the rear end portion of the muffler 51 are fixed with respect to screw holes formed on the muffler 51 with screws and the like. Elongated holes, through which screws fixing the muffler 51 to the transmission case M are inserted, are formed in different orientations on the front bracket 58 and the rear bracket 59. By forming the orientations of the elongated holes this way, dimensional errors of the muffler 51, errors of mounting positioning, and the like are absorbed to facilitate mounting.

As described above, the upper frames 24, the mount frame 31, and the left and right vertical frames 32 are arranged in a manner that the rear end portion of the vehicle body frame F forms an inverted trapezoid as viewed from the rear. Then, the continuously variable transmission V is arranged in an inclined manner such that the upper portion of the continuously variable transmission V is displaced rightward. On the left side of the upper portion of the continuously variable transmission V, inside a corner portion on the left side of the upper portion of the inverted trapezoid, and in a vicinity of the lower side of the lateral frame 37, the muffler 51 is arranged. By doing so, the internal space of the vehicle body frame F can be effectively used. Further, as FIG. 7 illustrates, in a plan view, the muffler 51 is arranged in a vicinity of the lateral frame 37 at a position overlapping the lower side of the lateral frame 37, and the muffler 51 is arranged at a position overlapping the upper side of the rear wheel drive shaft 62. As described above, the muffler 51 may also be arranged on the right side inside the vehicle body frame F. Also in such an arrangement, the muffler 51 is arranged at a position overlapping the upper side of the rear wheel drive shaft 62.

In particular, most of the upper surface of the muffler 51 is covered by the cover 50, and letters such as "HOT" (not illustrated in the drawings) are formed as projections by press working on the cover 50. Further, on the cover 50, by opening a portion of the letters and the like formed as projections by press working, rainwater and the like are unlikely to accumulate on the upper surface; and by forming convex-concave portions by press working, the surface area of the cover 50 is enlarged and a heat radiation effect is enhanced, and at the same time, strength is increased. The muffler 51 is fixedly connected to the rear end of the exhaust pipe 69. Even after the muffler 51 is attached to members in the vicinity of the transmission case M and the like, the exhaust pipe 69 and the muffler 51 are configured to be integrally detachable.

(Detachment of Drive Unit)

In the configuration as described above, by separating the drive unit C, together with the detachable frame unit G and the support frame 35, from the vehicle body frame F, and by separating the site of the upper anti-vibration mount 48, the drive unit C can be detached in a form of being withdrawn downward.

Specifically, the whole vehicle body frame F is lifted up; then, by removing the insertion bolts 33S, the brackets 33A of the front frame 33 are separated from the main frames 21; by removing the connecting bolts 32S, the lower members 32B are separated from the upper members 32A, which constitute the left and right vertical frames 32 (separating the detachable frame unit G); by removing the flange bolts 35S, the flange portions 35A on the two ends of the support frame 35 are separated from the main frames 21; and by separating the site of the upper anti-vibration mount 48, the upper ends or rear ends of the rear suspension units 41 are separated.

By performing this separation, the engine E is in a state of being supported on the support frame 35 by the lower anti-vibration mounts 45, and the transmission case M is in a state of being supported on the mount frame 31 by the lower anti-vibration mounts 45. As FIG. 13 illustrates, the drive unit C, including the engine E, the transmission case M, and the continuously variable transmission V, can be integrally detached from the vehicle body frame F in a form of being moved downward. Further, the muffler 51 is provided in the drive unit C and the rear wheels 2 are supported on the left and right vertical frames 32 via the rear suspension arms 39. Therefore, these parts can also be detached downward together with the drive unit C.

In particular, the engine E, the transmission case M, and the continuously variable transmission V are heavy, and these members are detached from the vehicle body frame F in a form of being moved downward. Therefore, as compared to a case where these members are detached in a form of being lifted upward, detachment can also be performed in a form of using a hydraulic jack to lower these members down, for example, without the need for lifting equipment. Further, in this working vehicle, it is also possible to adopt a configuration in which the front frame 33 is not connected to the main frames 21. By adopting such a configuration, time and effort can be reduced when separating the mount frame 31.

(Speed Change Operation Structure)

As FIGS. 6, 7 and 9-11 illustrate, the engine E and a lower position of the transmission case M are connected, and a gap H is formed at an upper position between the two members. A coupling member 71 is arranged at a position straddling over the top of the gap H, crossing over an upper surface of a rear portion of the engine E and projecting portions Ma protruding upward at a front portion of the transmission case M. A front end of the coupling member 71 is bolt-connected to the engine E, and a rear end of the coupling member 71 is bolt-connected to the projecting portions Ma of the transmission case M. This connection enhances the coupling strength between the engine E and the transmission case M.

At an upper position of the coupling member 71, a tubular body 72 is provided coaxial with a middle axis X in a lateral orientation. A middle actuation shaft 73 is rotatably supported with respect to the tubular body 72 in a manner fitted therein. A middle position of a plate-shaped input arm 74 connects to an end portion on a right side of the middle actuation shaft 73. A bell-crank-shaped output arm 75 connects to an end portion on a left side of the middle actuation shaft 73. A neutral cam 76 connects to a middle portion of the middle actuation shaft 73.

An arm-shaped stay 77 is fixedly provided on the outside of the tubular body 72. An end portion of an outer wire 78A of an operation wire 78 is supported by the stay 77, the operation wire 78 as a first operation device being linked to the accelerator pedal 16 as a speed change operation tool. Further, an end portion of an inner wire 78B of the operation wire 78 connects to one end portion of the input arm 74. A speed control rod 79 connects to the other end portion of the input arm 74, the speed control rod 79 as a third operation device transmitting an actuating force of the input arm 74 to a throttle mechanism Et of the engine E.

A speed change operation part 80 is arranged on a left side surface of the continuously variable transmission V. A speed change operation arm 81A is provided for swinging a speed change operation shaft 81 that protrudes from the speed change operation part 80 in a horizontal orientation. The speed change operation arm 81A in a neutral orientation illustrated in FIG. 6 shuts off hydraulic oil supplied from the hydraulic pump 53 to the hydraulic motor 54 to stop traveling. By swinging the speed change operation arm 81A, the hydraulic oil supplied from the hydraulic pump 53 to the hydraulic motor 54 is increased and an increase in traveling speed is realized.

Figure 12:
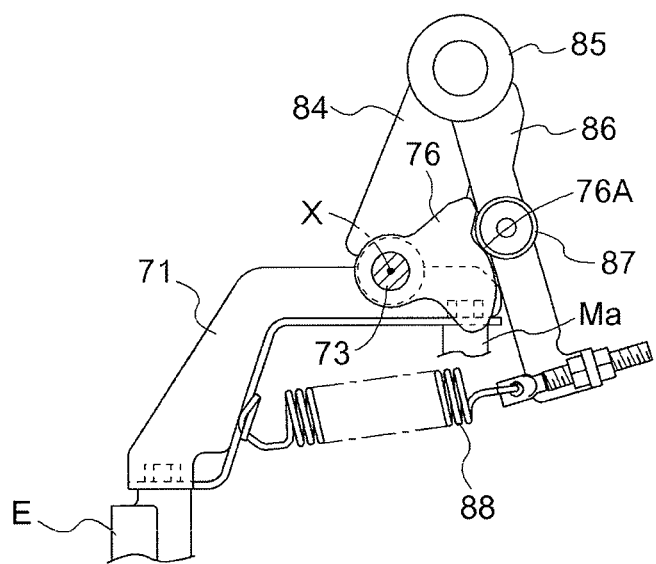
FIG. 12 is a side view of the speed change operation structure.

One end portion of an operation rod 82 connects to the speed change operation arm 81A, and the other end portion of the operation rod 82 connects to one arm of the output arm 75. An oil damper 83 for inhibiting rapid actuation of the speed change operation arm 81A connects to the other end portion of the output arm 75. As FIG. 12 illustrates, a concave cam surface 76A is formed on an outer periphery of the neutral cam 76. A neutral return arm 86 is supported on a support part 85 of a projecting end of an arm body 84 fixedly provided on the tubular body 72, in a manner swingable about an axis parallel to the middle axis X. An abutment member 87 formed from an idling roller engageable with the cam surface 76A of the neutral cam 76 is supported on the neutral return arm 86. A biasing force of a neutral return spring 88 acts on a swinging end of the neutral return arm 86.

According to this speed change operation structure, when the accelerator pedal 16 is depressed, the inner wire 78B is pulled, and the input arm 74 and the middle actuation shaft 73 rotate about the middle axis X. Along with the rotation of the input arm 74, the speed control rod 79 is pulled, and, with this operation force, the throttle mechanism Et is operated in an acceleration direction and an engine rotation speed is increased. Further, the output arm 75 rotates integrally with the rotation of the middle actuation shaft 73 caused by the depression operation of the accelerator pedal 16. By a pushing operation of the operation rod 82 linked to this rotation, the speed change operation arm 81A is operated in an acceleration direction and the continuously variable transmission V performs acceleration. That is, in conjunction with the depression operation of the accelerator pedal 16, traveling speed can be increased by increasing the driving speed of the continuously variable transmission V, while inhibiting engine stall by increasing the engine rotation speed.

Further, when the depression operation of the accelerator pedal 16 is released, the tension acting on the inner wire 78B from the accelerator pedal 16 is largely reduced. Due to the biasing force of the neutral return spring 88 that acts on the neutral return arm 86, the abutment member 87 presses against and enters into the cam surface 76A of the neutral cam 76. Thereby, the middle actuation shaft 73 returns to a neutral position and the speed change operation arm 81A returns to the stop position; in addition, the throttle mechanism Et also returns to a deceleration position, and the traveling vehicle body A stops.

Specifically, in this speed change operation structure, the operation wire 78 as the first operation device transmitting the depression operation force of the accelerator pedal 16 is arranged on the right side of the vehicle body. The operation rod 82 as the second operation device transmitting the operation force of the operation wire 78 to the speed change operation part 80 on the left side of the continuously variable transmission V is arranged on the left side of the vehicle body. The speed control rod 79 as the third operation device transmitting the speed change operation force of the operation wire 78 to the throttle mechanism Et on the right side of the engine E is arranged on the right side of the vehicle body. From this arrangement, using a configuration in which the middle actuation shaft 73 rotates about the middle axis X, the speed change operation is performed by effectively utilizing the spaces on the two sides of the drive unit C. In this speed change operation structure, it is also possible that the operation wire 78 as the first operation device, and the like, are arranged on the left side of the vehicle body, and the operation rod 82 as the second operation device, and the like, are arranged on the right side of the vehicle body. Further, an operation system operating the throttle mechanism Et may be arranged on either the left or right side of the vehicle body.

Operation Effect of the Embodiment

In this working vehicle, the drive unit C is configured by integrally connecting the engine E, the transmission case M, and the continuously variable transmission V, and the engine E and the transmission case M are supported by the left and right lower anti-vibration mounts 45 on the underframe UF. Therefore, it becomes possible for the weight of the drive unit C to be received by the lower anti-vibration mounts 45. Further, the upper portion of the transmission case M is supported by the upper anti-vibration mount 48 on the middle portion of the lateral frame 37, the two ends of which are supported by the upper frames 24. Therefore, even when the distance in the lateral width direction between the left and right lower anti-vibration mounts 45 is short, it is possible to inhibit vibration of the upper portion of the drive unit C, thereby realizing support with superior anti-vibration capability.

By arranging the continuously variable transmission V in an inclined manner such that the upper portion of the continuously variable transmission V is displaced toward one side in the lateral direction of the traveling vehicle body A, the space on the other side of the continuously variable transmission V in the lateral direction of the vehicle body is enlarged. Therefore, even when the space in which the continuously variable transmission V is arranged is relatively narrow, the muffler 51 can be arranged inside this space. Further, the engine E is arranged at a front position of the transmission case M in a manner deviated to one side (left side) with respect to the transmission case M; the exhaust manifold 68 is formed on one side (left side) on an upper portion of the engine E; and the muffler 51 is arranged in the same direction as the deviation of the engine E. Therefore, the exhaust pipe 69 can be linearly formed to linearly supply engine exhaust gas to the muffler 51, which simplifies the configuration of the exhaust system.

Further, as viewed in the longitudinal direction, a space of an inverted trapezoid shape is formed inside the vehicle body frame F, the inverted trapezoid shape being formed from the pair of left and right upper frames 24, the left and right vertical frames 32 in inclined orientations, and the underframe UF. Inside this space of the inverted trapezoid shape in the vehicle body frame F, the muffler 51 is arranged at a position in the vicinity of an upper left or right corner. Thus, the muffler 51 can be arranged at a corner of the vehicle body frame F in a state of being protected by the vehicle body frame F.

As described above, as viewed in the longitudinal direction, the vehicle body frame F is formed in a shape of an inverted trapezoid. By supporting the upper ends of the rear suspension units 41 on the lateral frame 37 that connects the left and right upper frames 24, it is possible for the orientations of the rear suspension units 41 to be close to orientations parallel to the swing directions of the rear suspension arms 39 (orientations perpendicular to arm surfaces of the rear suspension arms 39), so that low-impact compression of the rear suspension arms 39 can be performed.

The drive unit C and a support system of the rear wheels 2 are supported by the detachable frame unit G. Therefore, by separating the detachable frame unit G from the vehicle body frame F, the engine E, the transmission case M, the continuously variable transmission V, the muffler 51, and the rear wheels 2 can be integrally detached from the vehicle body frame F in a form of being withdrawn downward, and, for example, as compared to a configuration in which the drive unit C is withdrawn upward, the maintenance of the drive unit C becomes easy.

That is, the transmission case M is supported on the mount frame 31 by the lower anti-vibration mounts 45; the rear suspension arms 39 are swingably supported on the vertical frames 32 connected to the mount frame 31; and the rear wheels 2 are supported on the rear suspension arms 39. Further, the engine E is supported on the support frame 35 by the lower anti-vibration mounts 45. From this configuration, by separating the vertical frames 32 and separating the support frame 35 from the main frames 21, the engine E, the transmission case M, the continuously variable transmission V, the rear suspension arms 39, and the muffler 51 can be integrally detached in a form of being withdrawn downward, without the need of separating the drive system that transmits the driving force from the transmission case M to the rear wheels 2, and thus the operation for the separation is simplified.

The engine E and the transmission case M are connected at lower portions thereof. The upper portion of the engine E and the upper portion of the transmission case M are connected by the coupling member 71, which is arranged at a position straddling over the gap H formed by the upper portions, to enhance the coupling strength. Further, the middle actuation shaft 73 is rotatably supported by the tubular body 72, which is provided in a lateral orientation with respect to the coupling member 71. The operation force of the accelerator pedal 16 is transmitted to one side (right side) of the middle actuation shaft 73 to rotate the middle actuation shaft 73. From the other side (left side) of the middle actuation shaft 73, the speed change operation arm 81A of the continuously variable transmission V is operated to perform speed change. In such a configuration, without causing mechanical backlash and play at the middle actuation shaft 73, a speed change operation force is transmitted with high precision from one side of the drive unit C to the continuously variable transmission V on the other side to realize speed change operation.

In particular, when performing the speed change operation, by simultaneously operating the continuously variable transmission V and the throttle mechanism Et of the engine E, acceleration is realized without causing an engine stall. When the operation of the accelerator pedal 16 is released, the abutment member 87 formed from the idling roller engages the cam surface 76A of the neutral cam 76. Thereby, the middle actuation shaft 73 is rotated toward a neutral direction, and the continuously variable transmission V returns to the neutral position. At the same time, by operating the throttle mechanism Et to the deceleration position, a stop to traveling is realized.

Other Embodiments

In addition to the above-described embodiment, the present invention may also be configured as follows.

(a) The underframe UF is configured without providing the front frame 33 that connects to the front end of the mount frame 31. Or, in a configuration in which the front frame 33 is provided, the brackets 33A for connecting the front frame 33 to the main frames 21 are not provided. By such a configuration, when detaching the mount frame 31 from the vehicle body frame F, the number of places where separation is performed is reduced, which facilitates the operation.

(b) The rear end position of the main frames 21 that constitute the underframe UF is configured to be the position of the support frame 35. This reduces the weight of the vehicle body frame F, and in addition, similar to the embodiment (a), when detaching the mount frame 31 from the vehicle body frame F, this allows the number of places where separation is performed to be reduced, which facilitates the operation.

(c) The support frame 35 is fixedly provided with respect to the main frames 21. In this configuration, an operation to separate the engine E from the front mount supports 36 of the support frame 35 is necessary. However, a configuration for separating the support frame 35 from the main frames 21 is not necessary, which simplifies the configuration of the vehicle body frame F and facilitates manufacturing.

INDUSTRIAL APPLICABILITY

The present invention is applicable to a working vehicle having a transmission system transmitting a driving force of a transmission case provided on a vehicle body frame to rear wheels.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A working vehicle, wherein
a transmission case speed-changing a driving force from an engine and transmitting the driving force to left and right rear wheels is supported on a vehicle body frame,
the vehicle body frame comprising:
a pair of left and right upper frames extending in a longitudinal direction;
an underframe arranged below the upper frames; and
a plurality of vertical frames having upper ends connected to the left and right upper frames and lower ends connected to the underframe,
the vehicle body frame being provided with a mount frame, as a portion of the underframe, supporting the transmission case,
the mount frame being separated from or separably connected to a portion of the underframe provided at a position forward of the mount frame,
the vertical frames that connect to the mount frame being configured so that the upper ends of the vertical frames are separably connected to the upper frames or so that middle portions of the vertical frames are separable,
suspension arms being supported to be swingable about longitudinally orientated swing axes with respect to portions of the vertical frames that are fixedly provided on the mount frame,
the rear wheels being rotatably supported on swinging ends of the suspension arms, and
rear wheel drive shafts being provided transmitting the driving force from the transmission case to the rear wheels,
wherein the engine and the transmission are structured and arranged to be removable from the vehicle along with the mount frame while remaining connected to each other.

2. The working vehicle according to claim 1, wherein
a dimension of the mount frame in a vehicle body width direction is configured to be shorter than a dimension of the upper frames in the vehicle body width direction, of the plurality of vertical frames, the vertical frames that are connected to the mount frame are configured in an inclined manner such that upper ends of these vertical frames are increasingly displaced toward the outside of the vehicle body,
the plurality of vertical frames that are connected to the mount frame being configured such that lower members have lower ends connected to the mount frame and upper members have the upper ends connected to the upper frames, and
the upper members and the lower members are separably connected to one another.

3. The working vehicle according to claim 2, wherein the lower members and the upper members comprise respective corresponding U-shaped cross-sections structured and arranged for engagement with each other.

4. The working vehicle according to claim 3, wherein the lower members and upper members are engaged such that inner side surfaces of the lower members on an inner side of the vehicle in a left-right direction of the vehicle and outer side surfaces of the upper members on an outer side of the vehicle in the left-right direction of the vehicle are aligned to each other.

5. The working vehicle according to claim 1, wherein the engine is connected to a front position of the transmission case,
the vehicle body frame further comprises:
a support frame is separably connected to the portion of the underframe at a position forward of the mount frame, and
a mount support structured and arranged on the support frame to support supports the engine, and
wherein the support frame is attached to the engine, and
wherein the support frame, the engine, the transmission case and the mount frame are integrally removably fixed to the vehicle.

6. The working vehicle according to claim 5, wherein the mount frame and the support frame are not directly connected.

7. The working vehicle according to claim 1, wherein the mount frame is removably fixed to the vehicle in a rigid manner.

8. A working vehicle having a cargo bed, wherein
a transmission case speed-changing a driving force from an engine and transmitting the driving force to left and right rear wheels is supported on a vehicle body frame,
the vehicle body frame comprising:
a pair of left and right upper frames extending in a longitudinal direction;
an underframe arranged below the upper frames; and
a plurality of vertical frames having upper ends connected to the left and right upper frames and lower ends connected to the underframe,
the vehicle body frame being provided with a mount frame, as a portion of the underframe, supporting the transmission case,
the mount frame being separated from or separably connected to a portion of the underframe provided at a position forward of the mount frame,
the vertical frames that connect to the mount frame being configured so that the upper ends of the vertical frames are separably connected to the upper frames or so that middle portions of the vertical frames are separable,
suspension arms being supported to be swingable about longitudinally orientated swing axes with respect to portions of the vertical frames that are fixedly provided on the mount frame,
the rear wheels being rotatably supported on swinging ends of the suspension arms, and
rear wheel drive shafts being provided transmitting the driving force from the transmission case to the rear wheels,
wherein the cargo bed is mounted on a rear end of the upper frames, and
wherein the engine and the transmission are structured and arranged to be removable from the vehicle along with the mount frame while remaining connected to each other.

9. The working vehicle according to claim 8, wherein
a dimension of the mount frame in a vehicle body width direction is configured to be shorter than a dimension of the upper frames in the vehicle body width direction, of the plurality of vertical frames, the vertical frames that are connected to the mount frame are configured in an inclined manner such that upper ends of these vertical frames are increasingly displaced toward the outside of the vehicle body,
the plurality of vertical frames that are connected to the mount frame being configured such that lower members have lower ends connected to the mount frame and upper members have the upper ends connected to the upper frames, and
the upper members and the lower members are separably connected to one another.

10. The working vehicle according to claim 9, wherein the lower members and the upper members comprise respective corresponding U-shaped cross-sections structured and arranged for engagement with each other.

11. The working vehicle according to claim 10, wherein the lower members and upper members are engaged such that inner side surfaces of the lower members on an inner side of the vehicle in a left-right direction of the vehicle and outer side surfaces of the upper members on an outer side of the vehicle in the left-right direction of the vehicle are aligned to each other.

12. The working vehicle according to claim 8, wherein
the engine is connected to a front position of the transmission case,
the vehicle body frame further comprises:
a support frame separably connected to the portion of the underframe at a position forward of the mount frame, and
a mount support structured and arranged on the support frame to support the engine, and
wherein the support frame is attached to the engine, and
wherein the support frame, the engine, the transmission case and the mount frame are integrally removably fixed to the vehicle.

13. The working vehicle according to claim 12, wherein the mount frame and the support frame are not directly connected.

14. The working vehicle according to claim 8, wherein the mount frame is removably fixed to the vehicle in a rigid manner.

* * * * *

UNITED STATES PATENT AND TRADEMARK OFFICE
CERTIFICATE OF CORRECTION

PATENT NO. : 8,469,137 B2
APPLICATION NO. : 13/418889
DATED : June 25, 2013
INVENTOR(S) : T. Fujii Page 1 of 1

It is certified that error appears in the above-identified patent and that said Letters Patent is hereby corrected as shown below:

In the claims

Column 15, line 32 (claim 5, line 5) delete "is" after frame.

Column 15, line 36 (claim 5, line 9) delete "supports" after support.

Signed and Sealed this
Eighteenth Day of February, 2014

Michelle K. Lee
*Deputy Director of the United States Patent and Trademark Office*